March 12, 1963   H. G. MUENCHINGER   3,080,776
METHOD OF MAKING PUNCH-FORMING DIES
Original Filed Oct. 12, 1955   2 Sheets-Sheet 1
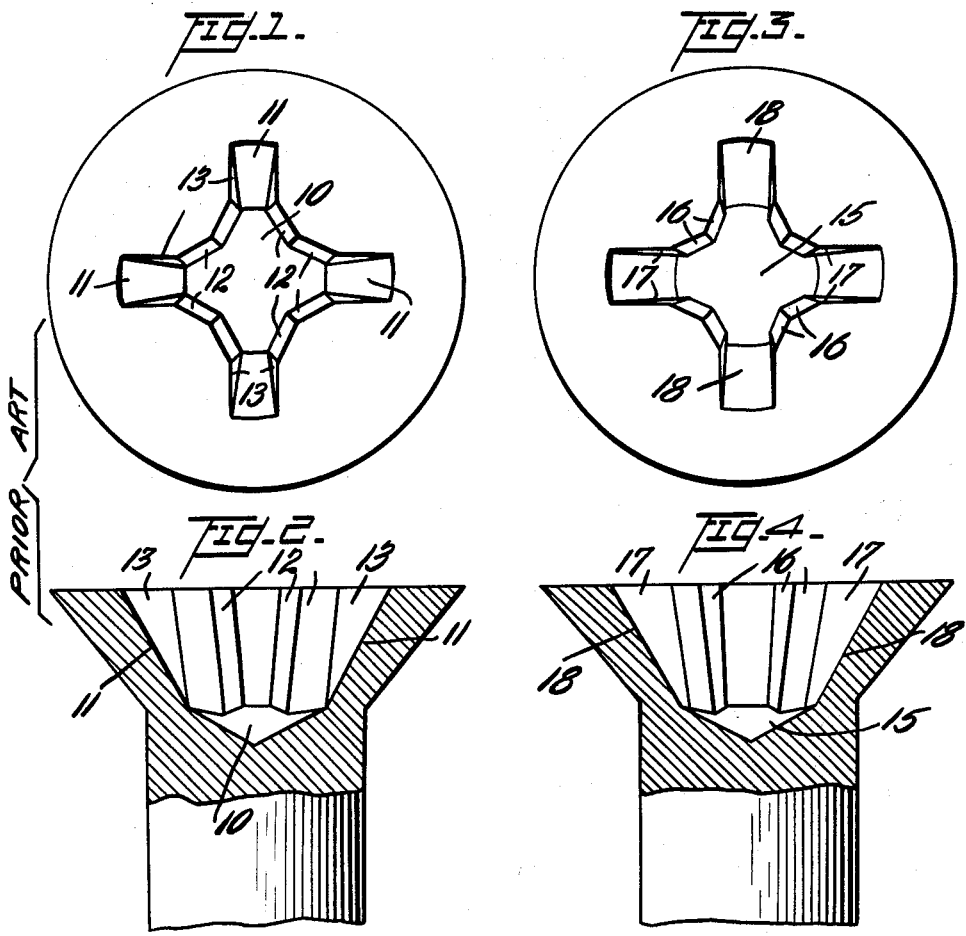
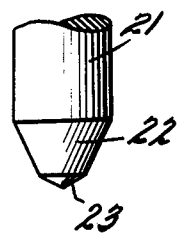
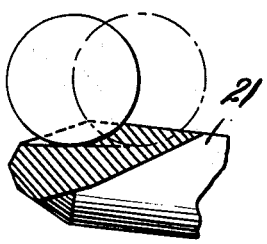
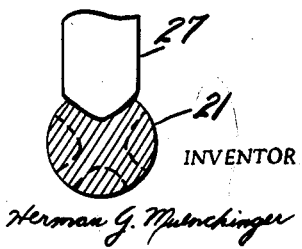
INVENTOR
Herman G. Muenchinger
BY
Watson, Cole, Grindle & Watson
ATTORNEYS

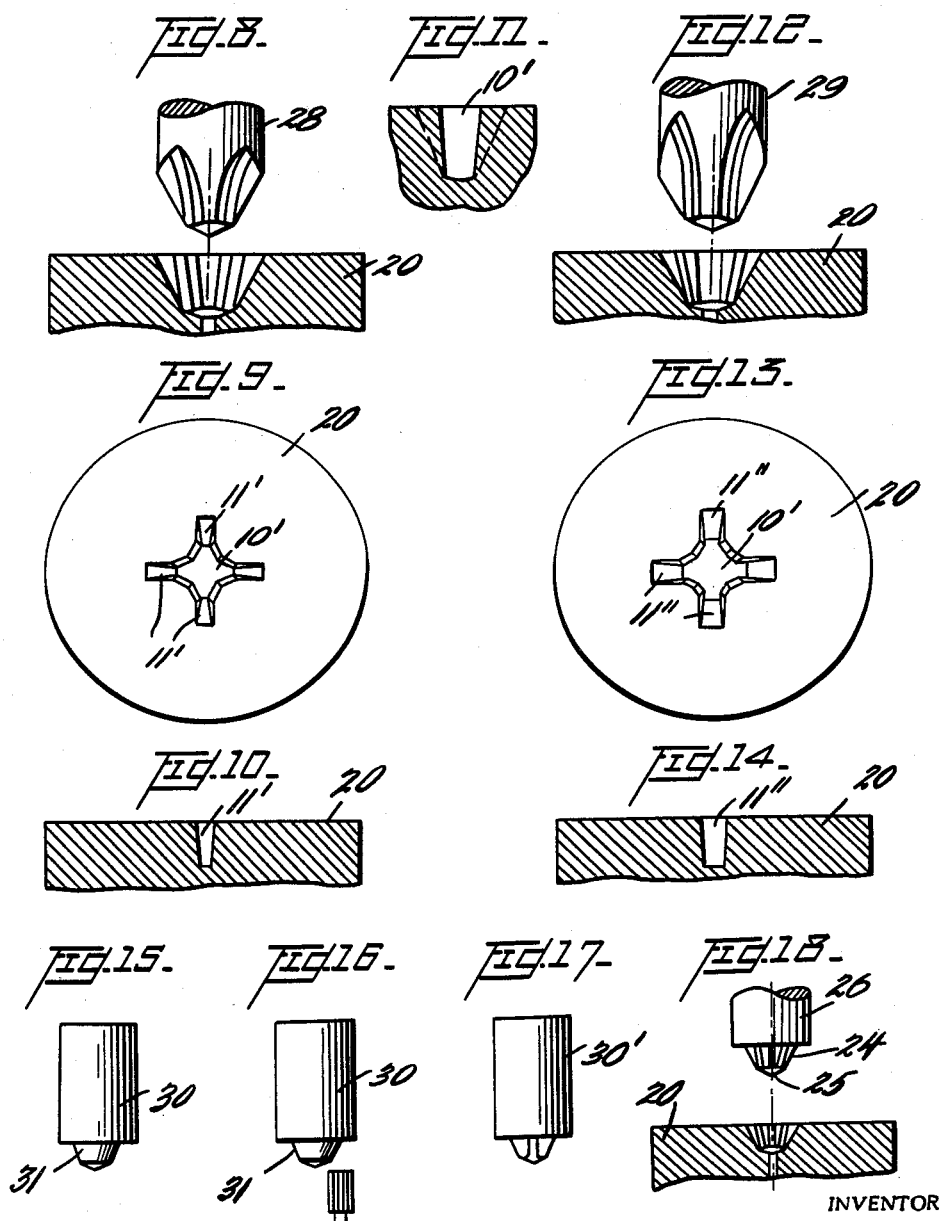

United States Patent Office 3,080,776
Patented Mar. 12, 1963

---

3,080,776
METHOD OF MAKING PUNCH-FORMING DIES
Herman G. Muenchinger, Chaplin, Conn., assignor, by mesne assignments, to Noma Lites, Inc., New York, N.Y., a corporation of Delaware
Original application Oct. 12, 1955, Ser. No. 540,037. Divided and this application May 19, 1959, Ser. No. 814,191
2 Claims. (Cl. 76—107)

This invention relates to the technology of threaded fasteners of the type having recessed heads, the particular recess in question being an improvement on the tool-engaging recess disclosed in United States Patent No. 2,046,839, a further development of which is described and claimed in United States Patent No. 2,474,994. The invention contemplates an improved punch for forming the improved recess hereinafter described, and a novel die or type used in the fabrication of such punches. The method of preparing said die or type is the subject of the present application which is a division of my co-pending application Serial No. 540,037, filed October 12, 1955, and since abandoned.

Threaded fasteners having tool-engaging recesses of the form described and claimed in United States Patent No. 2,046,839, have been very widely and successfully adopted, and fasteners of this general description are in common use throughout the civilized world. The particular recess disclosed in said patent has more recently been improved by reducing the horizontal taper of the side walls of the radial grooves or wings of the recess, as described and claimed in United States Patent No. 2,474,-994, thus reducing the tendency of the screw driver to be thrust axially out of the recess upon the application of high torque, or, to use parlance well known in the industry, reducing the throw-out component and thus increasing the value of torque which may be applied before throw-out occurs.

In recessed head screws of the type in question, it is desirable to provide a fairly generous vertical taper in the walls of the central portion of the recess, to facilitate seating of the driver in the screw recess, permit reasonable manufacturing tolerances for the tooling, and also to facilitate manufacture of the screws, i.e., punching of the recess by the well known cold heading machines. In the manufacture of recess forming punches by the technique most commonly employed heretofore, the degree of vertical taper of the side walls of the several wings of the punch has been, like the vertical taper of the walls of the central recess, a function of the milling angle employed in making the master punch. Therefore, the vertical taper of the wing walls of such punches, and the corresponding vertical taper of the groove walls of the screw head recesses, being governed to an extent by the desire to provide a sufficient vertical taper to the walls of the central portion of the recess, has been somewhat greater than is desirable from the standpoint of reducing or eliminating the aforesaid throwout tendency or component. In other words, the value of the maximum torque applicable to the screw has been limited by the necessity of providing a certain minimum vertical taper to the walls of the central portion of the recess. The vertical taper commonly employed in the manufacture of screws of the type described in Patent No. 2,474,994, both for the walls of the central recess and for the wing walls, has fallen between 5° and 10° and, according to the best practice, between 8° and 10°.

I have discovered that it is possible to manufacture screws of the type here in question having a recess the walls of the central portion of which taper vertically at a value between 5° and 10°, and specifically between 8° and 10° and whose wing walls may, at the same time, taper as slightly as 0° to 3° or, namely, may be vertical or have less than 3° vertical taper. The manufacture of such recesses involves, of course, the use of a specially designed punch, which in turn involves the use of a special punch-forming die or type, and a novel method of making such die or type.

Accordingly, it is an object of the present invention to provide a method for the manufacture of the dies or types mentioned in the preceding paragraph.

Other and further objects, features and advantages will be apparent from the description which follows, read in connection with the accompanying drawings in which FIGURE 1 is a plan view of a recessed head fastener now in widespread production and conforming to the disclosure of United States Patent No. 2,474,994;

FIGURE 2 is an axial section through the head portion of the fastener of FIGURE 1;

FIGURE 3 is a view similar to FIGURE 1 showing a fastener provided with the recess corresponding to a type or die made according to the present invention;

FIGURE 4 is a view similar to FIGURE 2, but illustrating the recess of FIGURE 3;

FIGURES 5 to 14, inclusive, illustrate steps in the production of a punch-forming die or type according to the invention; and FIGURES 15 to 18, inclusive, illustrate steps in the production of a header punch from a die or type made according to the invention.

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring now to the drawings, FIGURES 1 and 2 illustrate a recessed head fastener or so-called "Phillips" screw having a recess of the form now widely manufactured and almost universally used. The recess comprises a central portion 10 and four radial grooves 11. All of the recess walls including the wall 12 of the recess 10 and the side walls 13 of the grooves 11 are inclined so that the recess narrows downwardly. As described in United States Patent No. 2,474,994, the side walls 13 of the grooves 11 have a horizontal taper of 2° to 4° and a vertical taper of 8° to 10° which is proportional to the taper of the central recess walls since both tapers are a function of the milling angle employed in the manufacture of the master punch from which the recess is developed. While reduction of the horizontal taper, as described and claimed in Patent No. 2,474,994 has considerably reduced the tendency of the driver to be cammed out of the recess upon application of high torque, that tendency remains an important factor in the large scale use of recessed head screws, particularly on assembly lines and in mass production.

Referring now to FIGURES 3 and 4, it will be seen that a screw head recess according to the present invention is formed with a central portion 15, the walls 16 of which taper downwardly to the same extent as do the walls 12 of the recess illustrated in FIGURE 1, thereby providing a recess into which a driver may be as easily engaged as in the case of the recess of FIGURE 1. However, the side walls 17 of the radial grooves 18 are formed with a vertical taper of much lower value, namely, of less than 3°, so that the throw-out component of the torque applied in driving the screw will be greatly reduced. In certain cases the vertical taper of the walls 17 may even be eliminated, so that the aforesaid throw-out component will consist only in the vertical component of the force applied against the walls 16 of the central recess and, since the vast preponderance of driving torque is applied outwardly of the central recess, the throw-out component is thus substantially eliminated.

The formation of the screw head recess described in connection with FIGURES 3 and 4 requires, of course, the use of a header punch of complementary form which in turn requires a punch-forming die having the same form as the desired final recess. Such a die may be produced by the technique now to be described.

Briefly, the die 20, the operative portion of which is seen in FIGURE 18, is formed by succesisvely impressing a body of metal having a suitable composition and hardness with two master punches, one of which is provided with a nib having a central portion corresponding to the central portion of the desired recess, but wings of lesser thickness and greater taper, and the other of which is provided with a nib having a central portion of smaller section and lesser taper than that of the central portion of the desired recess, but with wings corresponding exactly to the radial grooves of the desired recess. Such master punches are manufactured by a technique generally similar to that now used in the manufacture of master punches in this industry. A master punch blank 21 (FIGURE 5) is machined to produce a point thereon having two conical surfaces of different tapers, designated by the numerals 22 and 23, respectively, corresponding generally to the conical surfaces 24 and 25 of the punch 26 of FIGURE 18. The end of the punch blank is then milled as illustrated in FIGURES 6 and 7 hereof, the milling angle being such as to produce the desired vertical taper in the central recess walls of the first master punch. The outline form of the milling cutter 27 employed in this operation is seen in FIGURE 7.

The second master punch is produced in a similar manner, employing a milling angle such as to produce the desired vertical taper in the wing walls of the second master punch and a milling cutter so shaped and adjusted as to provide radial wings of a thickness corresponding to the desired breadth of the grooves of the finished screw head recess, and hence, of the wings of the second master punch.

A die or type for forming the header punches, i.e., those used in the actual production of the screws, is then formed by successively impressing, hydraulically or otherwise, into a body of metal of suitable composition and hardness, the respective master punches. FIGURE 8 illustrates the die 20 after the first master punch 28 has been pressed thereinto and withdrawn. The recess thus formed in the die 20 is illustrated in plan in FIGURE 9. The vertical taper of the side walls of one of the radial grooves 11' is seen in FIGURE 10 and the taper of the walls of the central recess 10' is seen in FIGURE 11. The die 20 is then impressed with the second master punch 29 which, it will be noted, has thicker radial wings with less vertical taper. Thus the recess formed by pressing the die blank with the second master punch, seen in plan in FIGURE 13, is provided with a central portion 10' which is unchanged but has radial grooves 11" which are substantially wider than the grooves 11' and the side walls of which have little or no vertical taper, in any case not greater than 3°, as seen in FIGURE 14.

The successive impression of the die blank 20 with the master punches 28 and 29 may be repeated several times, if necessary, to ensure the production of a master type or die having a recess of which the central portion is the exact counterpart of the central portion of master punch 28, and radial grooves which are the exact counterpart of the wings of the second master punch 29. Also, the sequence of use of the respective master punches may be reversed, the punch 29 being used first and then the punch 28, if for any reason this is found to be desirable. The surface of the type recess produced as described is, of course, compressed and desirably work-hardened as a result of the several pressing operations.

When the master die or type 20 has been finished, header punches may be produced by its use in the manner described in United States Patent No. 2,066,372. That is, a punch blank 30 having a nib 31 and illustrated in FIGURE 15, is end milled as indicated in FIGURE 16 to produce the intermediate form 30' of FIGURE 17. As indicated in FIGURE 18, the punch blank is then pressed into the master die, produced as described above, and takes the final form corresponding to the screw head recess of FIGURES 3 and 4, the point of the punch being desirably work-hardened and compressed as a result of its cold working. Such punches are employed in the usual way in the production of headed screw blanks in the conventional two-stroke heading machine.

It has been found that since the improved recess of the present invention permits of the application of greater torque than heretofore, it is desirable to increase the strength of the corresponding driver bits. This is enabled by reason of the wider radial grooves of the present recess, which permits the corresponding drivers to be made with thicker radial wings, an important advantage in the many applications in which a high torque must be employed in order to set the screws to the requisite degree of tightness, and also in connection with some applications of self-tapping screws.

Another feature of the invention is that the reduction of vertical taper of the recess grooves is accomplished without diminishing vertical taper of the central recess, which enables the screws to be made by the conventional punching technique without added complications. Other advantages of the improved recess will also occur to those skilled in the art.

Having thus described the invention, what is claimed as new and desired to be secured by Letters Patent is:

1. In a method of making a type for forming header punches for cold heading, the steps of preparing a body of steel of suitable size, shape and hardness; forming a recess therein which recess is complete as to some entire wall portions thereof, by penetrating said body with a first master punch having a point generally of the shape of the desired header punches and comprising a central portion and radial wings, said portion and wings narrowing outwardly from the base of said point, the central portion of said first master punch conforming exactly in size and shape with the corresponding portion of the desired header punches, the wings of said first master punch being of lesser thickness than the wings of the desired header punches; withdrawing said first master punch; re-forming the recess formed by said first master punch by pressing thereinto a second master punch to complete said recess as to the remaining portions thereof, the point of which corresponds exactly with the desired header punches as to thickness and taper of the wing portions thereof, the central portion of the point of said second master punch being of smaller section than that of the desired header punch; withdrawing said second master punch; and heat treating and finishing said body.

2. In a method of making a type for forming header punches for cold heading, steps of preparing a body of steel of suitable size, shape and hardness; forming a recess therein and consecutively bringing into final form predetermined entire wall portions of said recess by penetrating said body alternately with two master punches each having a point generally of the shape of the desired header punches and comprising a central portion and radial wings, said portion and wings narrowing outwardly from the base of said point, the central portion of one of said master punches conforming exactly in size and shape with the corresponding portion of the desired header punches, the wings of said one master punch being of lesser thickness than the wings of the desired header punches, said other master punch corresponding exactly with the desired header punches as to thickness and taper of the wing portions thereof, the central portion of the point of said other master punch being of smaller section than that of the desired header punch; and heat treating and finishing said body.

References Cited in the file of this patent

UNITED STATES PATENTS

| | | |
|---|---|---|
| 2,699,693 | Stellin | Jan. 18, 1955 |
| 2,797,595 | Smith et al. | July 2, 1957 |